United States Patent
Peters

(10) Patent No.: US 8,598,491 B2
(45) Date of Patent: Dec. 3, 2013

(54) GTAW WELDER

(75) Inventor: Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1969 days.

(21) Appl. No.: 11/265,965

(22) Filed: Nov. 4, 2005

(65) Prior Publication Data

US 2007/0102408 A1   May 10, 2007

(51) Int. Cl.
*B23K 9/10* (2006.01)

(52) U.S. Cl.
USPC .............. 219/130.51; 219/130.5; 219/130.1

(58) Field of Classification Search
USPC .............. 219/130.1, 130.31, 130.5, 137.7
See application file for complete search history.

(56) References Cited

U.S. PATENT DOCUMENTS

| | | | |
|---|---|---|---|
| 4,038,515 A | 7/1977 | Risberg | |
| 4,479,046 A | 10/1984 | Mizuno | |
| 4,861,965 A | 8/1989 | Stava | |
| 5,225,660 A | 7/1993 | Mita | |
| 5,278,390 A | 1/1994 | Blankenship | |
| 5,338,916 A * | 8/1994 | Blankenship et al. | 219/130.4 |
| 5,683,602 A | 11/1997 | Stava | |
| 6,225,598 B1 * | 5/2001 | Nihei et al. | 219/137 PS |
| 6,365,874 B1 | 4/2002 | Stava | |
| 6,498,321 B1 | 12/2002 | Fulmer | |
| 6,515,259 B1 * | 2/2003 | Hsu et al. | 219/130.51 |
| 6,570,131 B1 * | 5/2003 | Stava | 219/130.4 |
| 6,717,108 B2 | 4/2004 | Hsu | |
| 6,998,574 B2 * | 2/2006 | Blankenship | 219/130.4 |
| 2005/0051525 A1 | 3/2005 | Yamada | |
| 2006/0175313 A1 * | 8/2006 | Kooken et al. | 219/130.1 |

FOREIGN PATENT DOCUMENTS

| | | |
|---|---|---|
| EP | 1249297 A | 10/2002 |
| EP | 1439021 A | 7/2004 |
| JP | 2004009115 A * | 1/2004 |

OTHER PUBLICATIONS

European Search Report—European Patent Application No. EP 06 01 0047—Date of completion of search Oct. 26, 2007, The Hague.

* cited by examiner

*Primary Examiner* — Henry Yuen
*Assistant Examiner* — Ayub Maye
(74) *Attorney, Agent, or Firm* — Hahn Loeser & Parks LLP

(57) ABSTRACT

An improvement in a welder including a power source for performing a TIG welding process across an electrode and a workpiece where the power source has a first output lead connected to the electrode and a second output lead connected to the workpiece with a controller for creating a waveform across the power leads. The waveform has a profile alternating between a first current section and a second current section at a given overall frequency and the sections each have a peak current in either the positive or negative direction and a duration. The improvement comprises at least one of the current sections being pulsed between a high current level equal to its peak current and a low current level in the opposite direction of the peak current at a pulsing frequency greater than the given overall frequency.

16 Claims, 9 Drawing Sheets

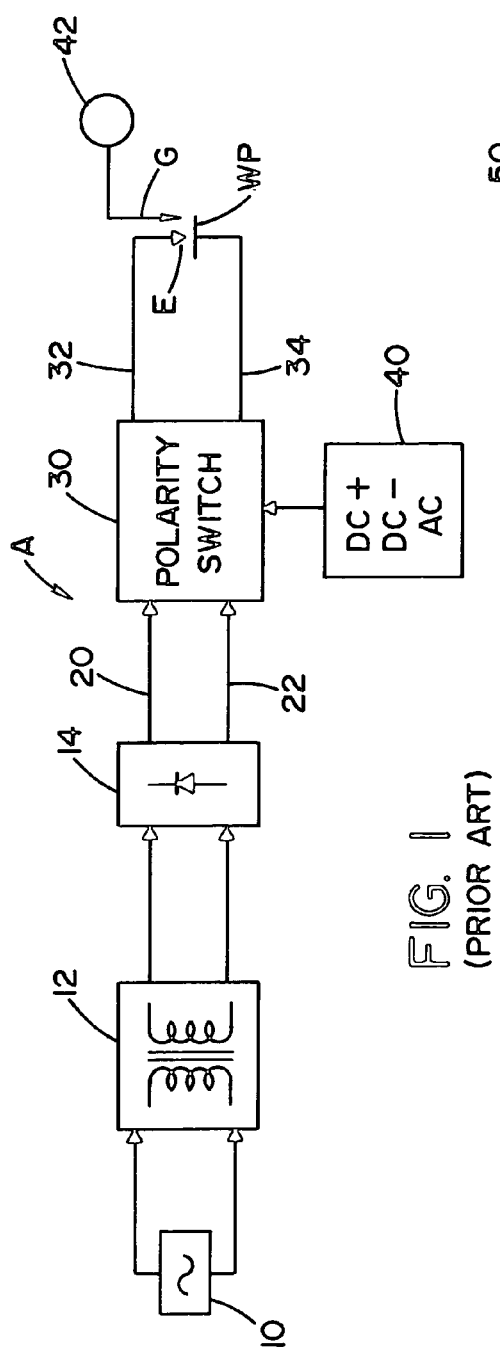
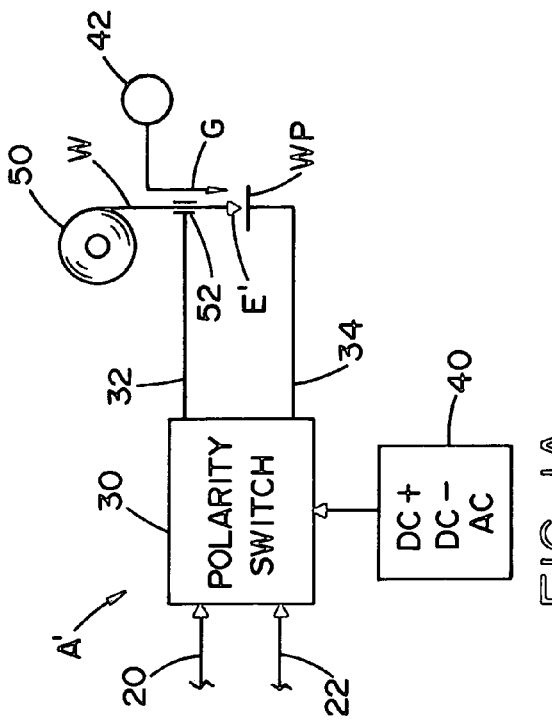
FIG. 1 (PRIOR ART)
FIG. 1A (PRIOR ART)

GTAW WELDER

The invention relates to electric arc welding and more particularly to a welder for performing a GTAW or TIG welding process.

INCORPORATION BY REFERENCE

GTAW or TIG welding involves use of a non-consumable electrode, such as a tungsten electrode, where current from a power source creates an arc between the electrode and workpiece for melting and joining the workpiece. Especially for metals such as aluminum, it is common practice to use an AC waveform for TIG welding. The electrode negative section of the waveform is used to perform the basic welding procedure and the electrode positive section of the waveform is used for cleaning the workpiece for assisting in the bonding procedure. Representative patents relating to AC TIG welding are Risberg U.S. Pat. No. 4,038,515; Stava U.S. Pat. No. 4,861,965; and, Stava U.S. Pat. No. 5,683,602. These AC TIG welders often have balanced AC welding, such as shown in Stava U.S. Pat. No. 5,683,602; however, for TIG welding of aluminum, the AC welding is often unbalanced as shown in Risberg U.S. Pat. No. 4,038,515 and Stava U.S. Pat. No. 4,861,965. These three TIG welding patents are incorporated by reference herein as background technology applicable to the present invention. As further background, many patents relate to the use of pulse welding using pulses having a background current level and a peak current level. Two representative patents showing power sources that generate pulsed waveforms are Mita U.S. Pat. No. 5,225,660 and Hsu U.S. Pat. No. 6,515,259. These two patents are incorporated by reference herein to show power sources of the type that create pulsed waveforms for various arc welding processes. The preferred embodiment of the invention utilizes a power source control technique for an inverter type power source, which technique involves the use of a digital waveform generator to control the pulsed profile of the welder current. Such waveform generator creates a series of switching signals directed to a pulse width modulator operated in accordance with the output of the waveform generator to control the actual profile of the pulses being created for electric arc welding. This technology was originated by assignee of the present invention, as described in Blankenship U.S. Pat. No. 5,278,390. This control technique utilizing a waveform generator to determine the waveform profile of an inverter type power source is also disclosed in Fulmer U.S. Pat. No. 6,498,321. The early Blankenship patent and the representative Fulmer patent, together with Stava U.S. Pat. No. 6,365,874 are incorporated by reference for background regarding the control technique where a waveform generator controls the profile of the output current waveform. The Blankenship patent, together with Hsu U.S. Pat. No. 6,717,108, illustrates the now common technique of using a memory stored state table for use by the waveform generator. A state table controls a particular waveform and is stored in memory. It is outputted to the waveform generator to create the desired current profile. This control technique is employed in the preferred embodiment of the present invention; therefore, Hsu U.S. Pat. No. 6,717,108 is also incorporated by reference to further illustrate background technology to the present invention. The totality of technology disclosed in these many patents constitutes the general state of the art to which the present invention is directed. They constitute background to the invention so the vast amount of well known background technology need not be repeated for an understanding of the improvement forming the present invention.

BACKGROUND OF INVENTION

In gas tungsten arc welding, sometimes referred to as TIG welding, the output current can be provided by any number of constant current power sources. Most metals are capable of being welded by the GTAW or TIG welding process; however, they are generally welded by a DC negative arc using an inert gas atmosphere. When welding aluminum or magnesium using the TIG welding process, the current is generally AC with an electrode positive current section and an electrode negative current section. These two sections are balanced using early technology; however, more recently, variable polarity power sources have become available. Some of these AC power sources can make only a limited amount of change between the positive polarity current section and the negative polarity current section. Using inverter technology with a waveform generator, as pioneered by assignee of the present invention, the positive current section and the negative current section of the waveform for TIG welding can be adjusted in shape, amplitude and duration. The normal DC TIG welding is performed with an alloyed tungsten electrode, whereas AC TIG welding of the fixed waveform type or the variable waveform type is performed with a pure tungsten electrode. The size of the electrode is determined by the application and the current range required for the welding process. If a given size electrode is welded at a current above its desired range of operation, the tungsten electrode may become too hot and the electrode will "spit" metal into the welding pool. This is not acceptable. In most cases the electrode spitting occurs in the positive half cycle or section of the waveform when the instantaneous positive current is too high for the particular electrode being used. Thus, when AC TIG welding, the magnitude and/or duration of the different current sections are controlled for adjusting the welding process to the desired conditions. DC TIG welding processes have been improved by using a pulsed technology. DC positive or DC negative TIG welding is now performed using a pulsed waveform since welders now have the capabilities of producing successive high and low current sections. Indeed, pulsing of the positive current or the negative current in TIG welding has become quite popular.

Pulsing of a DC waveform for TIG welding can have either a low overall frequency of the pulses or high overall frequency. Low frequency pulsing with a pulsed output in the range of less than 20 Hz is used in many TIG welding applications. Generally pulsing at this low overall frequency tends to lower the heat input to the weld. In many applications, the user will set the pulsing frequency to the same rate as the filler metal is deposited in the weld puddle. The long low background current sections between the high current sections of the low frequency pulses cools the puddle and reduces the heat input to the welding process. This is a disadvantage of the common practice when using low frequency pulsing for TIG or GTAW welding. Consequently, high frequency pulsing has been attempted. The pulsed outputs for either DC positive or DC negative has an increased pulsing rate of 20-1,000 Hz and preferably in the general range of 60-500 Hz. Such high frequency is an effort to focus the arc onto the workpiece. They can not be obtained by standard transformer based power sources. So the high frequency technique has been made possible by the advent of inverter based power sources. Inverters or choppers can perform TIG welding process at high frequency. These devices have, thus, solved special requirements of particular TIG welding applications. Even though high frequency can be created when using inverters, DC current was still used for TIG welding. Furthermore, the DC current was pulsed at a low frequency, or occasionally, at a high frequency as explained.

Within the last twenty years, manufacturers have been offering GTAW machines with variable polarity capabilities. This is an AC waveform for TIG welding wherein the positive current section of the waveform and the negative current section of the waveform can be different in duration and/or amplitude. Early machines for creating this variable polarity output were constructed based upon SCR technology as shown in Risberg U.S. Pat. No. 4,038,515 and Stava U.S. Pat. No. 5,683,602. More recently, inverters have been employed for TIG welding, such as shown in Mita U.S. Pat. No. 5,225,660 and Stava U.S. Pat. No. 4,861,965. An inverter based power source produces a square current waveform. When using a waveform generator for controlling the pulse width modulator of the inverter, a variable polarity waveform can be produced where the positive peak current level is reduced without affecting the negative polarity waveform employed for the actual heating. As is known, with an AC power source, irrespective of the type of power source, the negative polarity portion of the AC waveform, is used for penetration and the positive polarity portion is used for cleaning the workpiece. By development of an inverter type power source for TIG welding, together with the use of waveform control employing a generator loaded with a desired profile from a look-up memory, a desired, stored state table defines the selected waveform profile. This advanced power source technology allows implementation of the present invention.

THE INVENTION

In accordance with the invention, the current for TIG welding is pulsed or changes polarity at an overall low frequency in the general range of 0.1 to 20 Hz. Such low frequency pulsing is between a high level or peak current and a low level or background current. Each peak current section in accordance with the invention, is provided with a high frequency waveform superimposed on the overall low frequency. The superimposed waveform has a frequency preferably in the range of 30-500 Hz. This supplemental high frequency pulsing of one current section is superimposed upon the low frequency pulsed TIG welding current to focus the arc in at least one pulsed section of the current. This superimposed high frequency pulsing is more essential in the most negative current section of the waveform. When AC TIG welding is being performed the added pulsing is in the negative half cycle. When the base current is DC pulsed current, the superimposed pulsing is in the highest current section, either in the positive or negative, but preferably in the negative.

The superimposed high frequency on the pulsed waveform normally used for TIG welding causes current to fluctuate at a high frequency between a high current level and a low current level. In the preferred embodiment, the low current level is 25-80% of the high current level for a particular section of the waveform, such as the peak current or background current for DC pulsed welding or the positive polarity or negative polarity current sections of an AC waveform. When using a pulsed DC waveform with a low pulse waveform frequency, there is a background current section and a peak current section defining a pulse. On the peak section of the DC pulse waveform, a high frequency pulsing is added so that the peak current shifts between a high level and a low level. Preferably, the background current remains constant. The background current is not high enough to achieve the desired focusing, whereas pulsation in accordance with the invention of the peak current section of the DC waveform does function to focus the arc. A focused arc is more robust. Focusing a TIG arc is desirable when traveling fast, welding thin materials or when the joint promotes arc wandering away from the joint. Pulsing the arc at high frequencies makes a TIG arc more like a plasma welding arc, which is more focused. In summary, pulsing need not occur during the background portion of the DC pulsed waveform, but only during the peak current section of the waveform. In AC welding, the positive section remains the same as previous AC TIG welding. However, the negative current portion used for penetration includes superimposed high frequency pulses. Thus, in both a pulsating DC waveform and in an AC waveform, the cleaning portion of the waveform and the background portion of the waveform do not have the superimposed high frequency pulsating current for focusing the arc during the actual heat transfer procedure in the GTAW or TIG welding process.

In accordance with the present invention there is provided an improvement in a GTAW welder of the type having a power source for performing a TIG welding process across an electrode and a workpiece. The power source has a first output lead connected to the electrode and a second output lead connected to the workpiece and a controller for creating a waveform across the power leads. The waveform has a profile alternating between a first current section and a second current section at a given overall frequency. The waveform can be a pulsating DC waveform or an AC waveform. The first and second current sections each have a peak current and a duration. When DC welding is performed, the peak section of the pulse is the high current level positive or negative and the duration is the width of the pulse. The peak current of the other section is the highest level of the background current and the duration is the length of the background section. Thus, each section has a peak level with the peak of the pulse being greater than the peak of the background. When AC welding is performed, the peak current for the positive section is the maximum positive current and the peak current for the negative section is the maximum negative current. The duration for AC welding is the width of the negative and positive sections of the waveform. This definition of the pulsing DC waveform or the AC waveform is standard technology. The improvement of the invention involves at least one of the current sections being pulsed between a high current level equal to the peak current of that section and a low current level which, in practice, is about 25-80% of the high current level. This shift between high current level and low current level is at a pulsing frequency substantially greater than the given overall low frequency of the pulse waveform for DC or the polarity shift for AC. Thus, the invention involves modifying a standard pulsed DC TIG welding process or a standard AC TIG welding process by superimposing high frequency pulses in at least one section of the waveform. Preferably, the section is the pulse of a DC pulse waveform and the negative polarity section of an AC waveform. A high frequency waveform is superimposed on at least one section of the low overall frequency of the TIG welding process.

In accordance with another aspect of the present invention, the power source is an inverter operated at a frequency greater than about 18 kHz and the waveform profile is created by a digital waveform generator controlling the inverter. When the waveform shifts between a positive cleaning portion and a negative penetration portion, the amplitude and duration of the positive and negative portions of the waveform are adjustable. The superimposed high frequency is used primarily in the negative section of the waveform profile to focus the arc plasma during the heating process. The superimposed high frequency for a section of the waveform has a frequency in the range of 50 Hz to 1,000 Hz. The frequency is related to the pulse frequency of the total waveform. The overall DC pulsing frequency or the standard AC frequency is in the general range of less than 0.30 to 10 Hz and, indeed, less than 20 Hz. The invention is superimposing the high frequency of 50-1000 Hz onto a low overall frequency of less than 20-50 Hz. Standard TIG machines have produced 50/60 Hz AC waveforms. These sections are pulsed at a higher frequency in either the positive section or negative section, or both. When the AC waveform is pulsed at less than 20 Hz the output is in the range of 0.3 to 10 Hz and can be superimposed by a lower frequency.

In accordance with another aspect of the present invention there is provided a device for feeding filler wire into the gap between the electrode and workpiece. In one embodiment of this aspect, the wire feeding device for the filler wire is activated at timed intervals synchronized with the pulse in a DC pulsed waveform or the negative polarity sections of an AC waveform.

In accordance with another aspect of the invention, there is provided a TIG welding process performed across an electrode and workpiece with a power source having a first output lead connected to the electrode and a second output lead connected to the workpiece with a controller for creating a waveform across the power leads. The waveform has a profile alternating between a first current section and a second current section at a given frequency. In the DC pulsed waveform, one section is the pulse and the other section is background between the pulses. In an AC waveform, one section is the positive portion of the waveform and the other section is the negative portion of the waveform. In accordance with the invention, at least one of the current sections is pulsed between a high current level equal to the peak current of that section and a low current level. The pulsing is performed at a frequency greater than the given frequency defining the pulse waveform or the AC waveform of the process.

The primary object of the present invention is the provision of an improved TIG welder, which improved TIG welder has superimposed high frequency current pulses in one section of the waveform.

Another object of the present invention is the provision of a method of TIG welding, either using a pulsed DC waveform or an AC waveform, wherein the pulse or the negative section of the waveform is superimposed with an alternating current at a frequency substantially greater than the pulsing frequency or the AC frequency of the waveform. The superimposed high frequency current shifts between a maximum level and a minimum level wherein the minimum level is in the general range of 25-80% of the maximum level. In some implementations, the high frequency current is superimposed on both portions of the waveform which involves either the background current or the positive cleaning portion of an AC waveform.

Yet another object of the present invention is the provision of a TIG welder and TIG welding process, as defined above, which welder and process is performed by an inverter operated by a pulse width modulator under control of a waveform generator having an output profile loaded into the generator from a memory device containing waveforms stored as state tables.

Still a further object of the present invention is the provision of a TIG welder and method, as defined above, which welder and method focuses the arc during the penetration portion of the waveform.

These and other objects and advantages will become apparent from the following description taken together with the accompanying drawings.

BRIEF DESCRIPTION OF DRAWINGS

FIG. 1 is a block diagram of a prior art transformer based TIG welder with an output polarity switch for DC positive, DC negative or AC TIG welding;

FIG. 1A is a partial block diagram showing a slight modification of the welder in FIG. 1 wherein DC positive, DC negative or AC MIG welding is performed;

PREFERRED EMBODIMENTS

Figure 2:
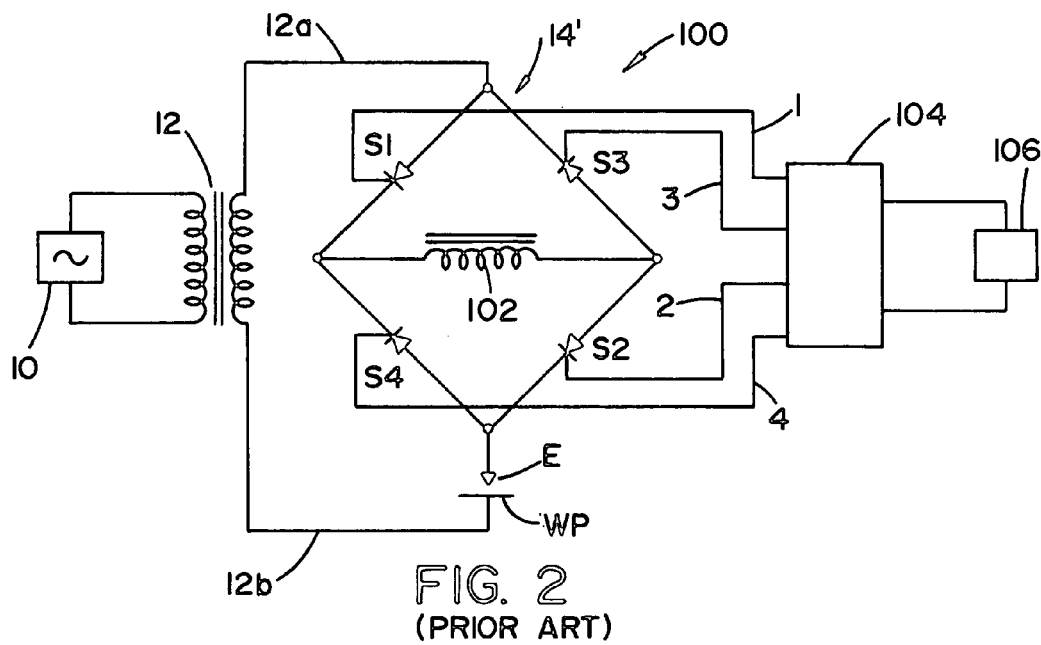
FIG. 2 is a wiring diagram of an AC TIG welder using SCR technology, as disclosed in Stava U.S. Pat. No. 5,683,602.

Referring now to the drawings used to illustrate the preferred embodiments only and not for the purpose of limiting same, FIG. 1 illustrates a well known TIG welder A schematically illustrated as including power supply 10, transformer 12 and rectifier 14 for creating a DC current across intermediate leads 20, 22 directed to the input of polarity switch 30 having output leads 32, 34 connected across electrode E and workpiece WP, respectively. The current and polarity at the TIG welding process in the gap between electrode E and workpiece WP is determined by the output of controller 40. Inert gas G from supply 42 is used during the TIG welding process for shielding the molten metal of workpiece WP as it solidifies. The same welder can be used for MIG welding as shown in FIG. 1A. Modified welder A' is provided with a spool 50 of wire W directed through contact tip 52 to constitute consumable electrode E'. FIGS. 1 and 1A are prior art representations of a welder for TIG welding and its modification to perform MIG welding. Well known TIG welder A, as schematically illustrated in FIG. 1, is modified as shown in FIG. 2 to perform AC TIG welding. Welder 100 has output leads 12a, 12b to direct AC current from transformer 12 to an AC rectifier 14' as disclosed in Risberg U.S. Pat. No. 4,038,515 and Stava U.S. Pat. No. 5,686,602. This rectifier produces an AC current across electrode E and workpiece WP by controlling SCRs, S1, S2, S3 and S4 in pairs by the trigger outputs 1, 2, 3 and 4 from controller 104 driven by an auxiliary power supply 106. TIG welders shown in FIGS. 1 and 2 are the early TIG welders used in the welding industry for over twenty years and can be used to balance the negative polarity and positive polarity sections of the AC waveform. The output of welder A is either a positive current or a negative current with a controlled DC level. Consequently, using early TIG welders, the welding process is DC positive, DC negative or AC with a balance between the polarity portions of the AC waveform. In some of the welders, the AC pulses can be unbalanced. This early technology has been generally replaced by inverters, as pioneered by assignee of the present invention for TIG welding.

Figure 3:
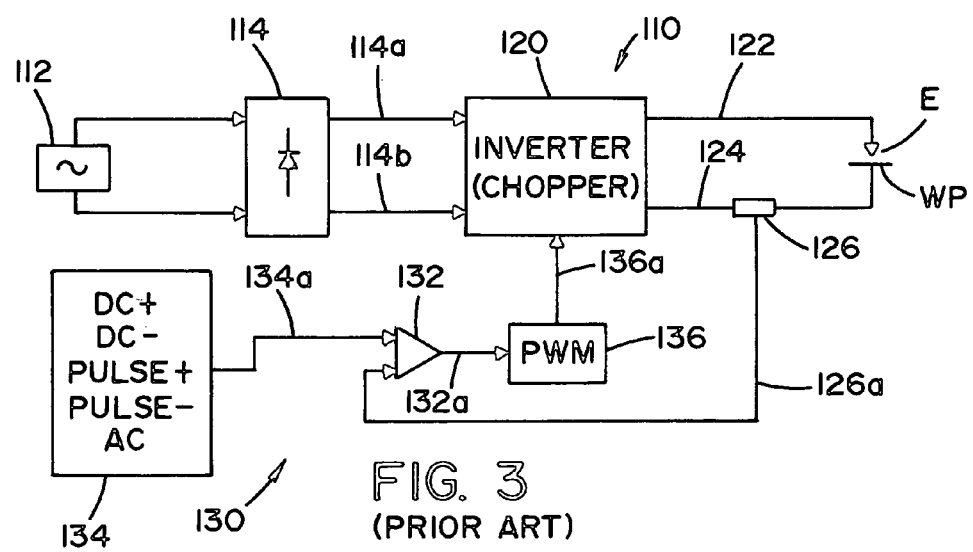
FIG. 3 shows a prior art TIG welder wherein a waveform generator controls an inverter to perform either a pulsed DC TIG welding process or an AC TIG welding process.
Figure 3A:
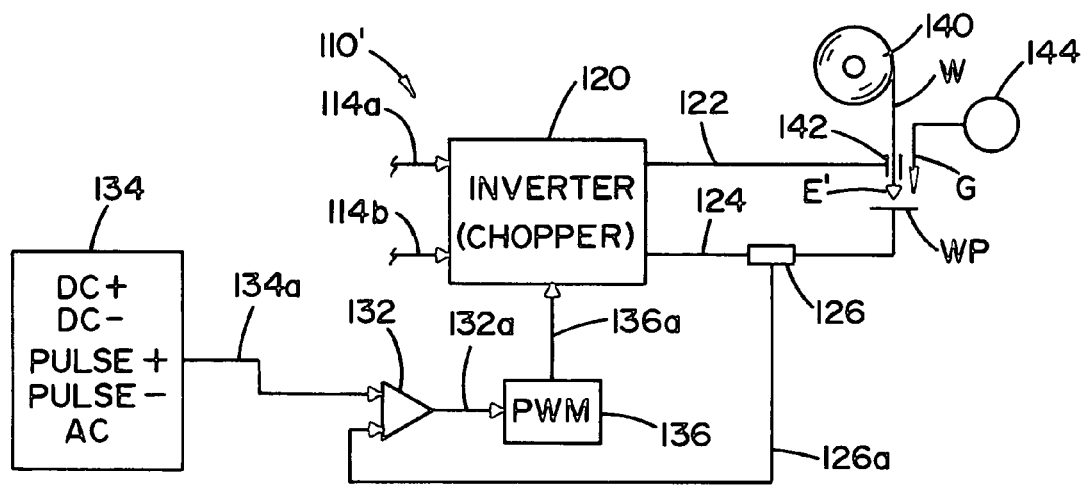
FIG. 3A is a partial block diagram illustrating the welder shown in FIG. 3 modified for MIG welding.

An inverter based TIG welder 110 is illustrated in FIG. 3 where supply 112 is directed to rectifier 114 having output leads 114a, 114b directing a DC signal to the input of inverter or chopper 120 having output leads 122, 124 connected across electrode E and workpiece WP with shunt 126 measuring the instantaneous or real time current during the TIG welding process. The waveform across output leads 122, 124 is determined by controller 130 which is normally a digital device such as DSP or microprocessor having certain components illustrated in analog form in FIG. 3. The instantaneous current signal on line 126a is directed to one input of error amplifier 132 having another input from the waveform generator or wave designer 134 with output 134a being directed to the second input of amplifier 132. The signal on line 134a is a signal from generator 134 that may be DC positive, DC negative, pulse positive, pulse negative or AC. The waveform profile signal in line 134a is followed by the control signal in output 132a of error amplifier 132. This control signal is directed to the input of a digital pulse width modulator, normally the phase shift type, to produce current signals on line 136a. The signal on line 136a determines the current at any given time across output leads 122, 124 of inverter or chopper 120. Using the prior inverter based technology schematically represented in FIG. 3, the waveform across electrode E and workpiece WP can have a variety of waveform profiles determined by stored state tables loaded into generator 134 in accordance with the particular TIG welding process to be performed. The same welder can be used for MIG welding as shown in FIG. 3A wherein modified welder 110' includes a supply 140 of welding wire W to create electrode E' as the wire is moved through contact tip 142 preparatory to melting and consumption in a MIG welding process. Inert gas G is provided from supply 144 in accordance with standard welding technology.

By using selected welders as so far described, various output waveforms can be directed across the electrode and workpiece for performing an arc welding process, which process in the preferred embodiment of the present invention is a TIG welding process now generally known as GTAW welding. Several representative prior art waveforms used for TIG welding are illustrated in the current graphs of FIGS. 4-7.

Figure 4:
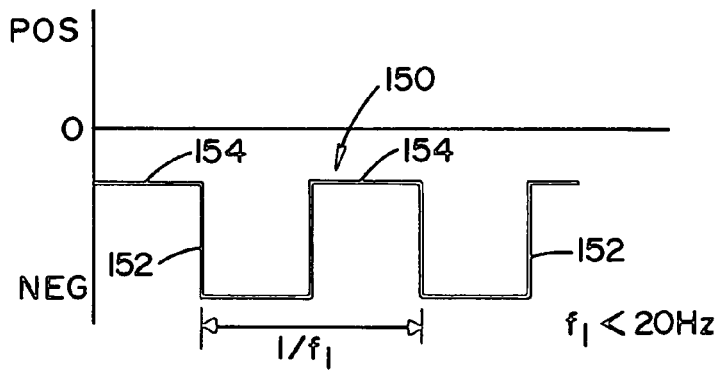
FIG. 4 is a current graph showing a pulsed DC negative waveform for TIG welding.
Figure 5:
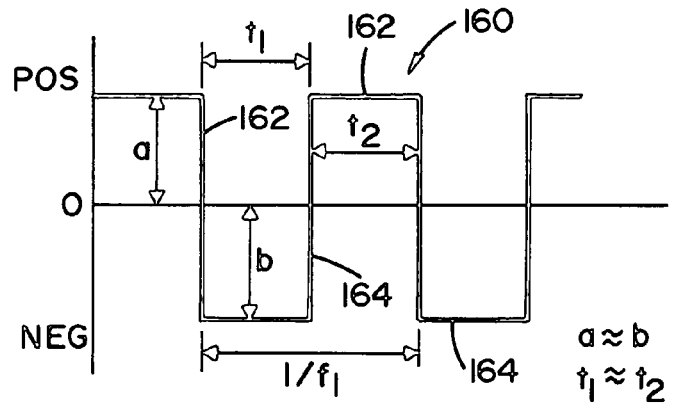
FIG. 5 is a current graph similar to FIG. 4 disclosing an AC waveform for TIG welding.
Figure 6:
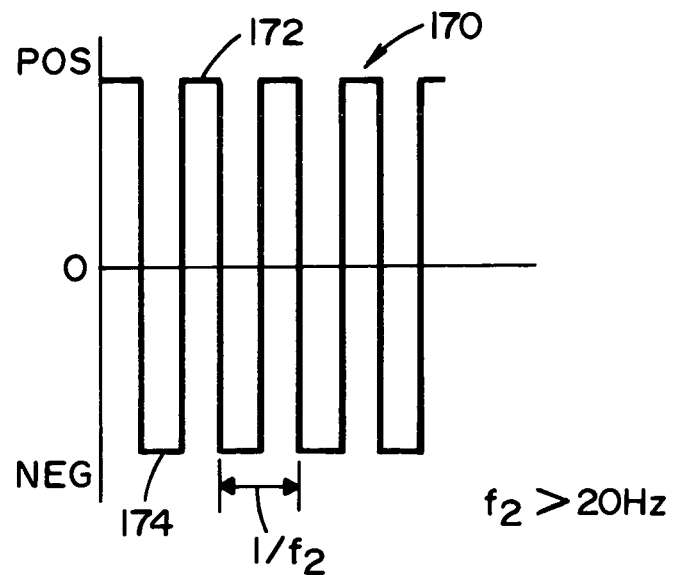
FIG. 6 is a current graph showing a high frequency pulsating output waveform suggested for improving TIG welding.
Figure 7:
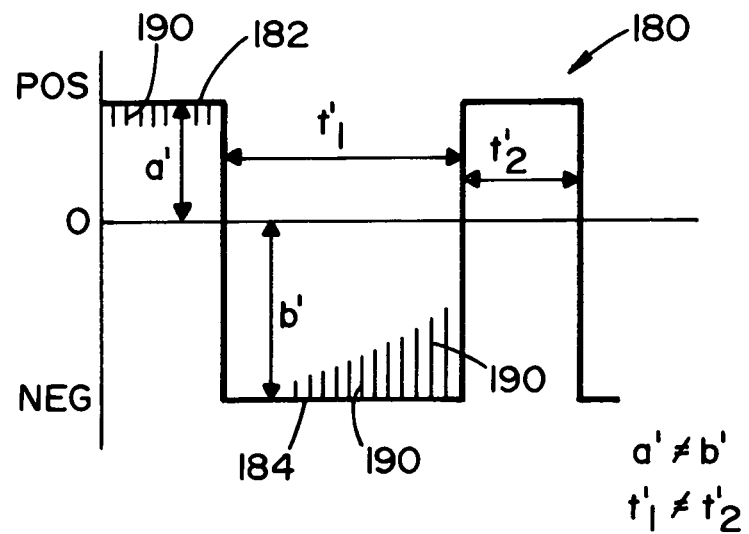
FIG. 7 is a current graph similar to the graph shown in FIG. 5 illustrating a variable polarity waveform wherein the amplitude and/or duration of the positive and negative current sections are different.

TIG welding in the past has been primarily performed with a constant negative current where the electrode is negative with respect to the workpiece. The present invention is related to the use of a pulse waveform for TIG welding. The pulsed waveform can have a single polarity such as shown in FIG. 4. Current graph 150 is a pulsed waveform controlled by the waveform signal on line 134a. In this pulsed waveform, the negative pulses 152 are separated by background current sections 154. A waveform is defined as the combination of a pulse 152 and background 154. In defining this waveform, the peak current of pulse 152 is in the negative direction whereas the peak current in background section 154 is in the positive direction. Consequently, the waveform including sections 152, 154 has a first section with a peak current negative and another section with peak current in the positive direction, even though both of the peak currents are negative. To obtain the same type of waveform to perform a positive pulsed TIG welding process, graph 150 is merely shifted upward into the positive current area of the graph. In that instance, the pulses are sections 154 and the background is section 152. The peak current of pulsed section 154 is then in the positive direction as before and the peak current of section 152 is in the negative direction. Thus, the showing of FIG. 4 is a pulsed TIG waveform which is in a single polarity either negative, as illustrated, or positive as shifted upward. The waveform has a low frequency of $f_1$ which low frequency is less than about 20 Hz. TIG welding is often performed using an AC waveform, as represented by current graph 160 in FIG. 5. This graph includes positive sections 162 separated by negative sections 164. The waveform is the combination of section 162 and section 164 wherein the peak current of section 162 is in the positive direction and the peak current of section 164 is in the negative direction. In the prior art waveform of graph 160, amplitude a of positive section 162 is generally equal to amplitude b of the negative section 164. The duration $t_1$ and $t_2$ of the two opposite polarity sections of a single waveform is substantially the same. Thus, the waveform of graph 160 is essentially the same as the waveform of graph 150 except it is shifted to halfway between positive and negative. The two waveforms of graphs 150, 160 are common waveforms used for many years in TIG welding. It has been found that the use of a low pulsing frequency tends to lower the heat input to the weld. The low current section 154 between high current sections 152 tends to cool the puddle. Thus, it was assumed that the waveforms shown in FIGS. 4 and 5 could be improved by increasing the pulsing frequency as illustrated in FIG. 6. Current graph 170 shows a waveform comprising positive current sections 172 and negative sections 174 pulsed at an overall frequency greater than 20 Hz. This waveform has been used for aluminum and is about 50 to 60 Hz with conventional technology or about 150 Hz when using an inverter or chopper. This high frequency has been attempted for both single polarity pulsing as shown in FIG. 4 and AC pulsing as shown in FIG. 5. In both instances, the result was unsatisfactory because the time at the various peak levels was not sufficient to stabilize the welding process or the focus of the arc itself. This higher overall frequency adds too much cleaning because of too much positive cycle resulting in the arc seeking more oxide and becomes unstable. Consequently, merely increasing the frequency $f_1$ to frequency $f_2$ as illustrated in FIG. 6 did not stabilize the arc plasma as done in the present invention. Another attempt to improve the TIG welding process was introduction of a variable polarity concept obtainable only by using an inverter based power source in a controlled manner such as pioneered by Lincoln Electric of Cleveland, Ohio. A variable polarity TIG welding waveform is illustrated in FIG. 7 as current graph 180 having a positive current section 182 and a negative current section 184. The peak currents of these two sections are in opposite polarity directions. An inverter with a waveform generator is used to produce waveform 180 of FIG. 7 by creating a plurality of current sections 190 at a frequency greater than 18 kHz. The amplitude a', b' and duration $t_1$ and $t_2$ of both current sections can be modified over large ranges. This variable polarity waveform obtainable by using inverter technology controlled by a waveform generator allows adjustment of the positive cleaning cycle and the negative penetration cycle of a TIG welding operation. However, the frequency of the waveform formed by sections 182, 184 is decreased by increasing duration of negative polarity section 184. Thus, the adjustability obtainable by the state of the art power sources still lacks control over the arc, especially during the penetration cycle. The present invention overcomes this difficulty and allows the advanced technology of inverter type TIG welders with waveform generators to be used in a manner that controls the arc during the heat process when performing AC TIG welding.

Figure 8:
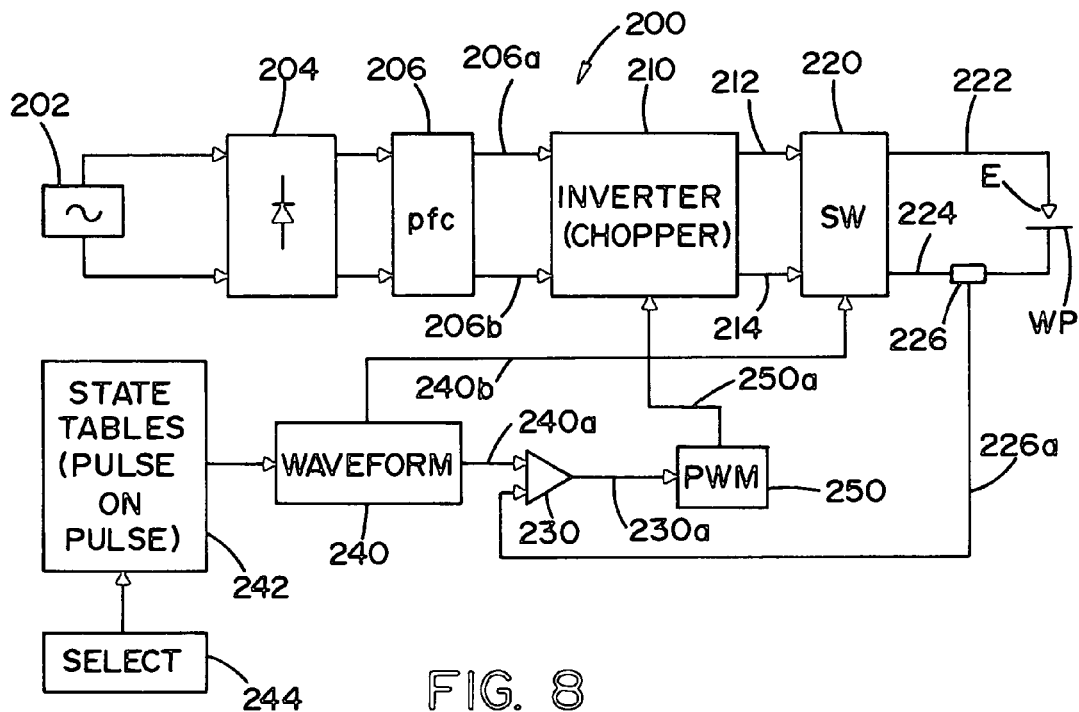
FIG. 8 is a block diagram of the power source used in practicing the present invention.

To perform the TIG welding process of the present invention, an inverter based welder controlled by a waveform generator is employed. A schematic representation of such a welder is illustrated in FIG. 8 where welder 200 includes a power supply 202 for directing an AC signal to the input of rectifier 204. The output of the rectifier is a DC signal introduced into boost or buck converter 206 for correcting the power factor at the input side of welder 200. The DC signal at the output of converter 206 is a second DC signal across leads 206a, 206b. This second DC signal is the input of inverter or chopper 210. The desired waveform for performing TIG welding across electrode E and workpiece WP is created by inverter 210 across intermediate leads 212, 214 directed to the input of polarity switch 220. Output leads 222, 224 of welder 200 direct the waveform profile with the selected polarity across the welding operation. Instantaneous current is sensed by shunt 226 to create a voltage signal in line 226a at the input of digital error amplifier 230 having an output 230a. The signal on this output is controlled by waveform generator 240. Digital data of the particular waveform profile for the TIG welding operation is stored in a memory unit 242 containing a large number of state tables selected by program or subroutine 244. Thus, output 240a of waveform generator 240 contains the desired profile signal for a given waveform and is connected to the second input of error amplifier 230. At the same time, generator 240 creates a signal on line 240b to control the polarity of switch 220. The waveform or profile shape and polarity at any given time is controlled by waveform generator 240 in accordance with the digital data obtained from memory unit 242 and selected by subroutine 244. The digital signal on line 230a controls pulse width modulator 250 to create a high frequency profile signal on output line 250a. The control of welder 200 includes various elements performed digitally by selected programs in accordance with standard control technology for inverter based power sources. Welder 200 is controlled by known program techniques to create the desired unique waveforms across electrode E and workpiece WP.

Figure 9:
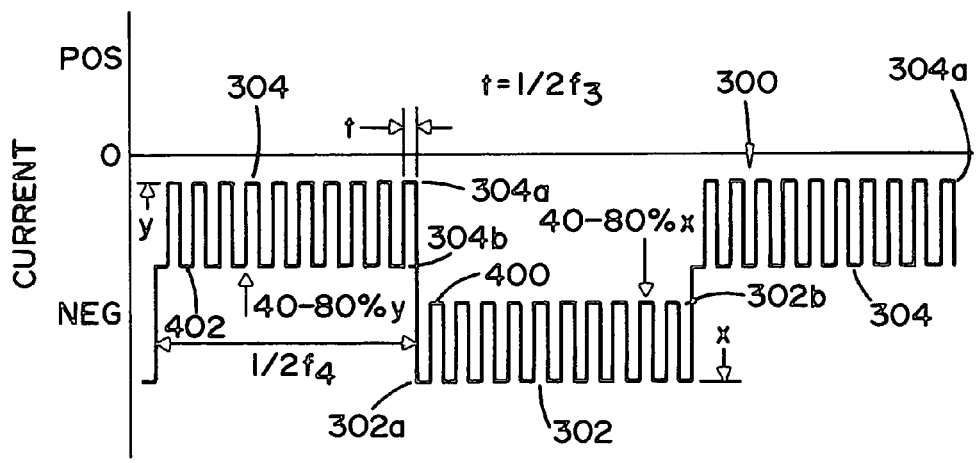
FIG. 9 is a current graph showing a modification of a DC negative pulse waveform used for TIG welding and practicing the present invention.

Practicing of the present invention for pulsing either DC positive or DC negative is illustrated by the waveform of current graph 300 shown in FIG. 9. This waveform is illustrated as pulsing DC negative which is the preferred polarity for a pulsed TIG welding process. Before describing the novel modification of a pulsed TIG waveform as represented by graph 300, the overall low frequency pulsing of the prior art will be explained. Thereafter, modification of the standard pulsed TIG welding waveform in accordance with the invention will be described. The waveform of graph 300 includes current sections 302, 304 with peak currents 302a, 304a, respectively. Peak current 302a of the negative pulse 302 is in the negative direction. Peak current 304a of background portion 304 is in the positive direction. Sections 302, 304 have the same duration and are similar to the sections shown in the prior art waveform of FIG. 4. This low frequency pulsed TIG welding waveform is created by the waveform generator 240 using well known prior art programs. The present invention modifies the standard low frequency aspect of the waveform shown in graph 300 from the prior art version in FIG. 4 using the concept shown in FIG. 9 wherein a high frequency pulsing is superimposed upon levels 302a and 304a. The superimposed high frequency pulses are shown as pulses 400 in section 302 with a low current level 302b that is generally 25-80% of the high current level 302a. In practice the relationship is about 60-70%. In a like manner, high frequency pulses 402 in section 304 have a low current level 304b that is 25-80% of the high level 304b of section 304. Thus, the invention is superimposing high frequency pulses in one or both of current sections 302, 304 of the standard TIG welding waveform. The frequency of pulses 400, 402 is substantially greater than the low frequency of the individual pulses of the process. The individual pulses have a frequency of less than 20 Hz wherein the superimposed high frequency pulses have a frequency substantially greater than this low frequency and preferably in the range of 60-500 Hz. Indeed, the frequency $f_3$ is as high as about 1,000 Hz. Thus, the present invention is the superimposing of high frequency pulses on the low frequency pulsed waveform of the TIG welder as schematically illustrated in FIG. 9. This is accomplished by any appropriate program one of which is schematically illustrated as program 500 in FIG. 10.

Figure 10:
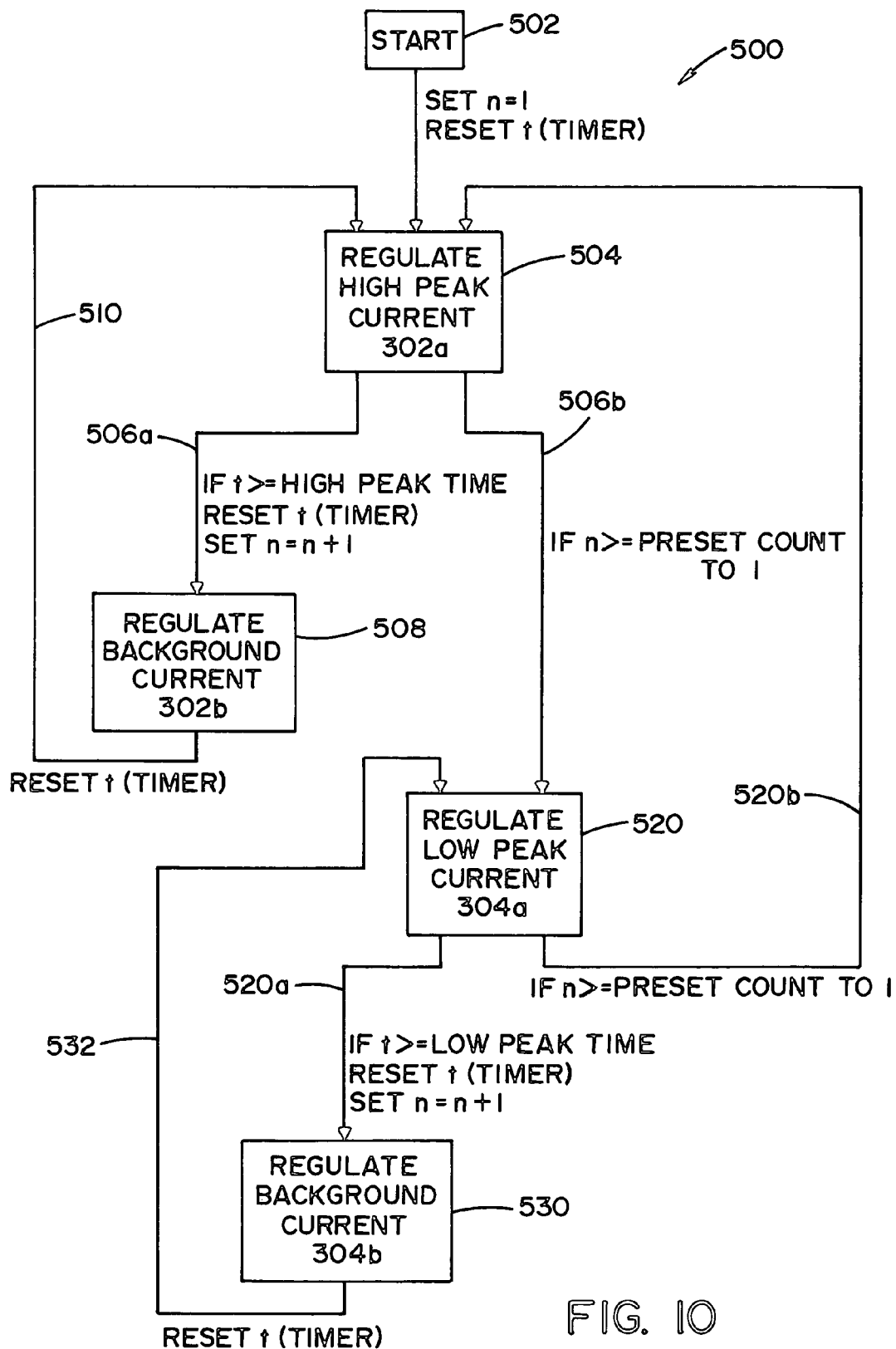
FIG. 10 is a flow chart of a controller program to perform the novel pulsed DC waveform as shown in FIG. 9.

Program 500 set forth in FIG. 10 is representative of a program to form the waveform of graph 300. When the welding process is started, as indicated by block 502, the high frequency pulses 400 are implemented by a routine of program 500 starting with regulation of the high peak current 392a as done by step 504. Pulse 400 is created at peak level 302a until time t expires. This event resets the pulse width timer and increments the counter or pulse accumulator. The timer and counter are not part of the program. After expiration of pulse time t, the waveform generator regulates the current to background current level 302b, as indicated by step 508. When that low level current for pulse 400 has existed for time t, a signal in line 510 proceeds to generate the next pulse 400. This continues until there is a signal created by step 504 in line 506b. This indicates that the waveform generator has created the number of pulses 400 set in the down counter so the waveform generator shifts to positive current section 304 as indicated by block 520. The counter is set to 1. A pulse 402 at level 304a is created until time t expires. This occurs as indicated by line 320a to actuate block or step 530 for generating the low level current 304b of pulses 402. After the waveform generator has maintained a low level for the time t, line 532 reimplements the pulse 402 until there is a signal in line 520b indicating the set number of pulses 402 and, thus, the end of section 304. Line 520b then commences the next pulse section 302 by resetting the counter to 1. The next pulse is processed in accordance with the previous explanation. Lines 510, 532 reset the pulse timer to again implement time t for the next portion of a high frequency pulse created by the waveform generator in accordance with the present invention. The invention involves the creation of the waveform shown as current graph 300 in FIG. 9. Various programs can be employed for implementing this type of waveform using an inverter based power source and a waveform generator as herein described and as described in patents incorporated by reference.

Figure 11:
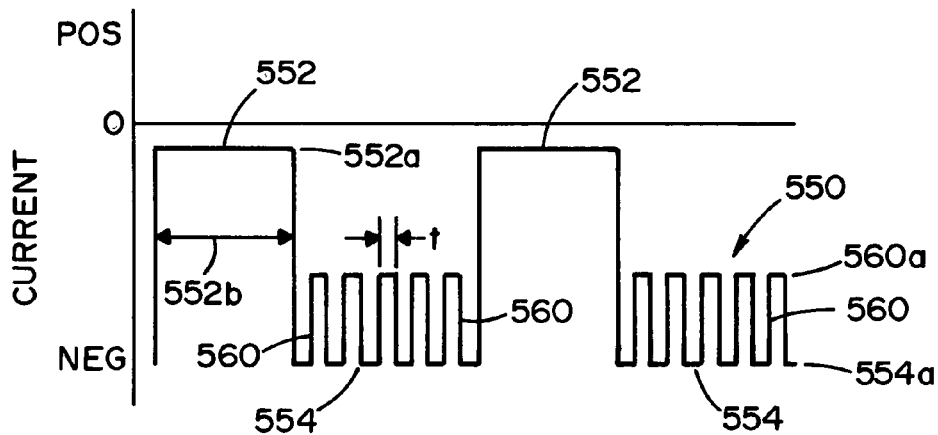
FIG. 11 is a current graph of a pulsed DC waveform for TIG welding with high frequency pulses superimposed only on the peak current section of the spaced pulses.
Figure 12:
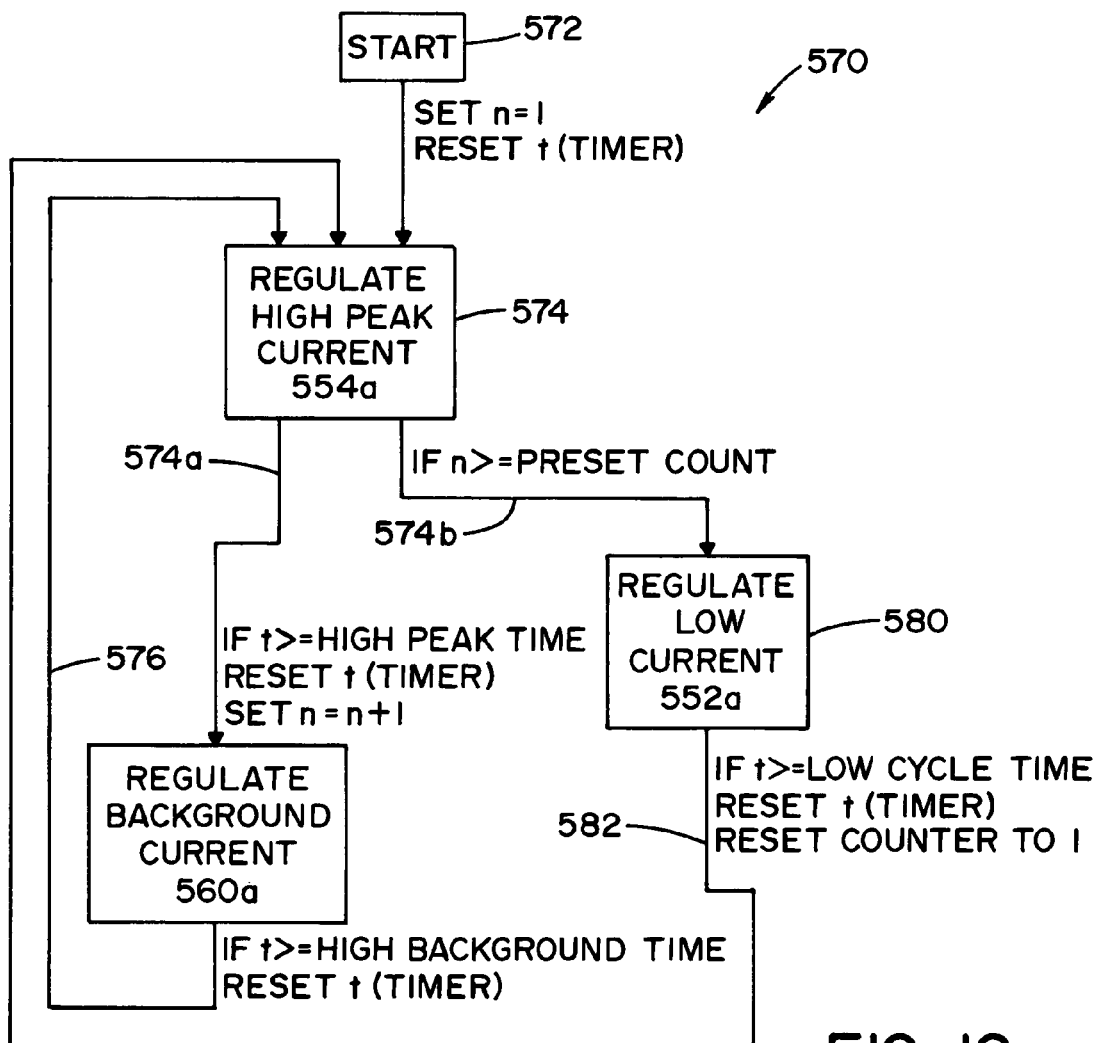
FIG. 12 is a flow chart similar to the flow chart shown in FIG. 10 to perform the DC pulse waveform shown in FIG. 11.

In the preferred embodiment of the invention, the DC negative pulsed waveform shown in FIG. 9 is modified to the waveform shown in the current graph 550 of FIG. 11. In the waveform of this graph, the positive directed current section 552 of the waveform has no superimposed high frequency pulses. Pulses are only superimposed on section 554, which is the negative directed section of the waveform comprising a cycle combining section 552 and section 554. The positive directed peak current 552a of section 552 is constant during the duration 552b of section 552. The invention involves modification of the negative directed pulse or section 554 having a peak value 554a with superimposed pulses 560. Pulses 560 each have a lower level 560a which is 25-80% of high level 554a. Each pulse 560 has a time t which is essentially the same as the pulses in the embodiment of the invention illustrated in FIG. 9. This time is determined by the frequency of the pulses, which varies between 60-1,000 Hz. Various programs can perform the embodiment of the invention as illustrated in FIG. 11. However, a representative computer program 570 is illustrated in FIG. 12 wherein the program is started at block 572 which sets the number of the down counter for pulses 560 and resets the timer to time t. Upon the start of the waveform by the waveform generator, section 554 is first implemented by a step shown as block 574 having outputs 574a, 574b similar to the outputs of block 504 in FIG. 10. Block 574 regulates the current of section 554 to high level 554a until time t expires. Then the timer is reset and the down counter is increased by the output on line 574a causing regulation of the background current portion 560a of a pulse 560. The background or low level portion 560a is maintained for time t. After the expiration of the time, the timer is reset and line 576 cycles into the high level current 554a of pulse 560. This procedure continues until the counter counts out indicating a termination of the current section 554. This is acknowledges by a signal on line 574b that activates block 580 to regulate the negative current of section 552. The constant negative current level 552a is a peak current level in the positive direction. Peak current 552a is in the positive direction and peak current 554a is in the negative direction. When the section 554 has reached the given pulse count, a signal in line 574b shifts to low current section 552 which is regulated until the cycle time expires so a signal in line 582 resets the timer and counter and shifts back to high frequency section 554. Program 570 controls the waveform generator of welder 200 to perform the waveform shown in FIG. 11.

Figure 13:
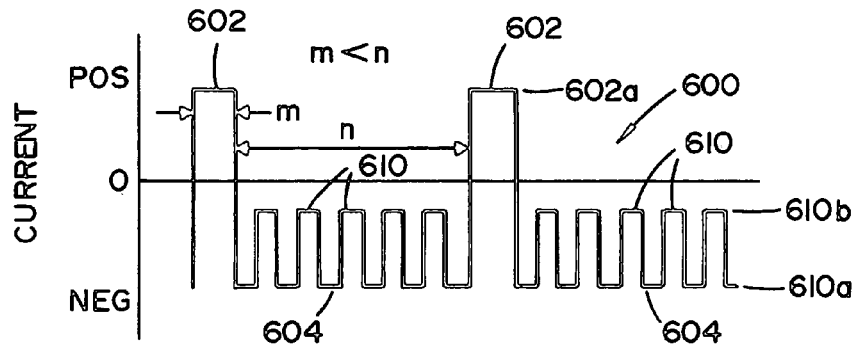
FIG. 13 is a current graph showing an AC TIG welding process with a short constant cleaning cycle and a long penetration cycle wherein the present invention is used to modify the penetration cycle.
Figure 14:
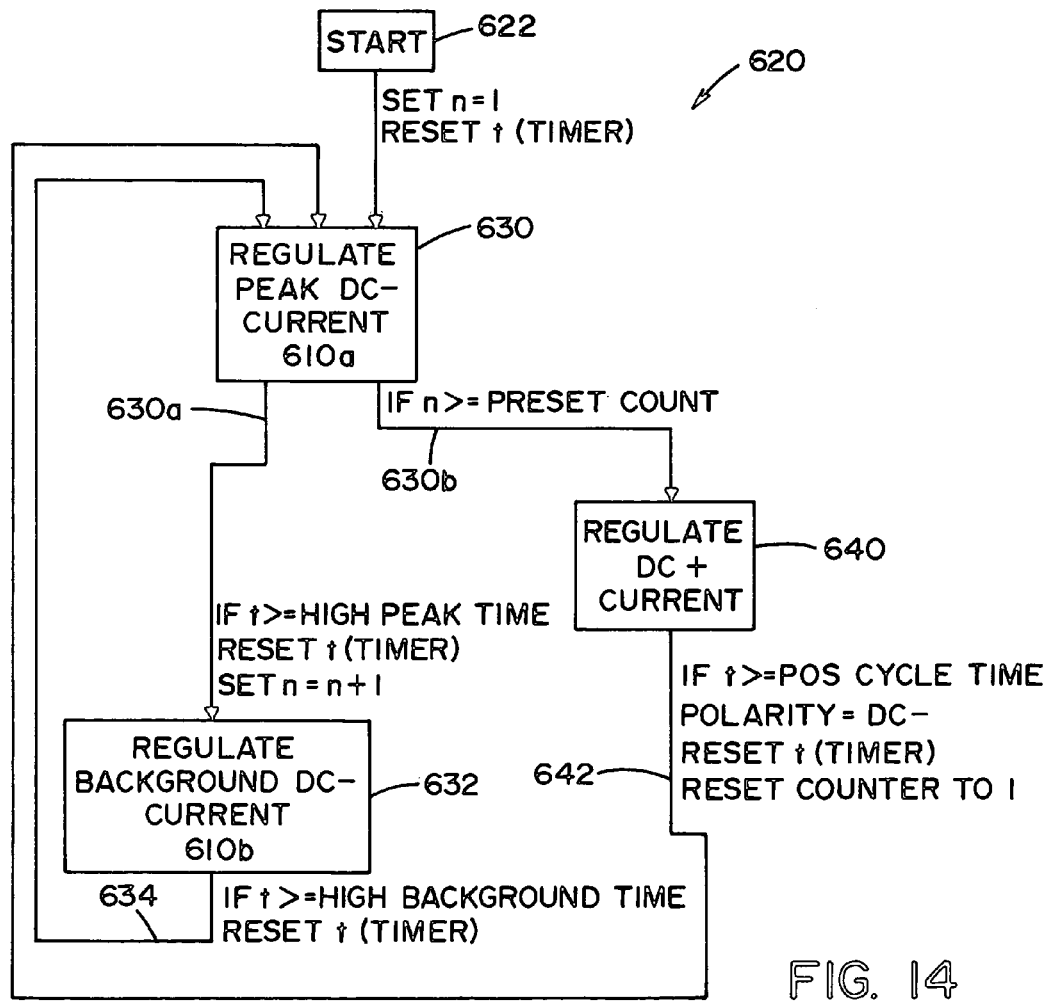
FIG. 14 is a flow chart of the controller program used to perform the AC embodiment of the invention as schematically illustrated in FIG. 13.

The preferred implementation of the present invention is a pulsed DC negative waveform as shown in FIG. 11; however, the invention is equally applicable to an AC TIG welding waveform as shown in FIG. 7. AC TIG welding by using the present invention is illustrated in FIG. 13 wherein current graph 600 is an AC waveform having a positive current section 602 with a high current level 602a and a negative current section 604 with pulses 610 having a high current level 610a and a low current level 610b with the low current level being 25-80% of the high current level. Level 610b is shown as about 25% of level 610a in this embodiment. In this AC implementation of the present invention, high frequency pulses 610 are superimposed only on the negative current section of the AC waveform including a cycle of both sections 602 and 604. Positive section 602 is used for cleaning and negative section 604 is used for penetration, which function requires control of the arc. The duration m of the cleaning pulse is substantially less than the duration n of the penetration portion of the waveform. Computer programs for implementing the embodiment of the invention shown in FIG. 13 can take a variety of forms. A representative program is illustrated in FIG. 14 wherein the waveform is started as represented by block 622. The pulses 610 are then regulated by alternating from the high current 610a to the lower current 610b. To accomplish this high frequency creation of pulses, regulation step 630 has an output 630a indicating that the high current section 610 is to be terminated, but the number of pulses is not sufficient to terminate the total negative section of the waveform. A signal in line 630a activates regulator step 632 for controlling the low level current 610b until time t expires. Then, a signal in line 634 reinitiates the step 630. This process continues until the number of pulses 610 set into the down counter, not shown, has been reached. When the number of counts has been reached, a digital signal in line 630b shifts the waveform into positive section 602 as indicated by step 640. Step 640 maintains level 602a constant until the set time for the positive cycle has expired. The polarity is then changed as indicated by a signal on line 642 to reset the counter to 1 and the timer so the pulsed negative section is processed by creating high frequency pulses 610. Superimposing pulses 610 on selected sections of a pulsed TIG waveform is a novel aspect of the present invention and the particular portions whether AC or DC pulsed is a matter of the amount of control over the heat and arc desired for the TIG welding process.

Figure 15:
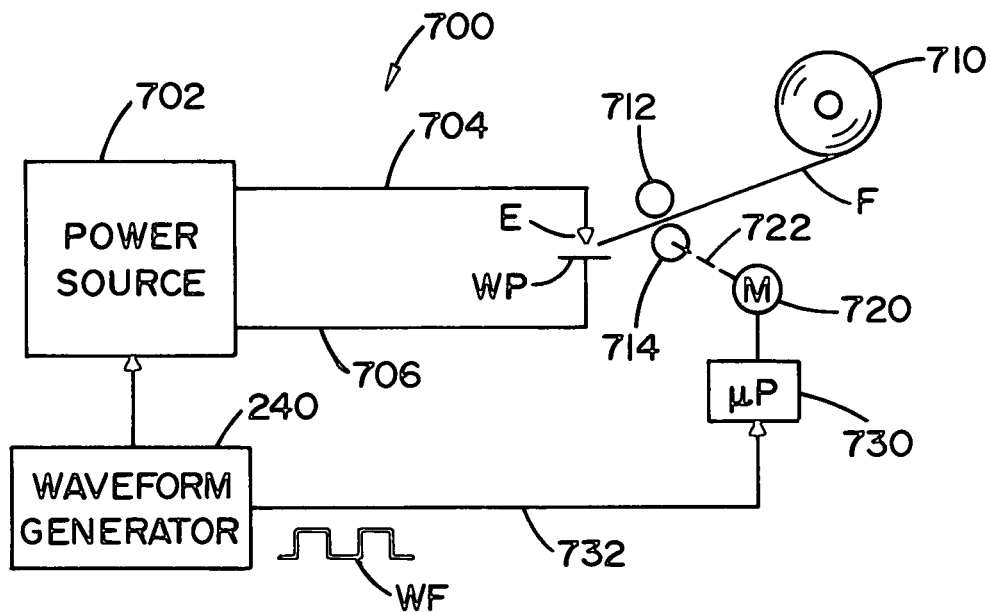
FIG. 15 is a block diagram schematically illustrating a synchronized device for feeding filler wire into the gap between the electrode and workpiece for a TIG welding process using the present invention; and, FIG. 16 is a block diagram similar to FIG. 15 using a hot filler wire in a welder constructed in accordance with the present invention.
Figure 16:
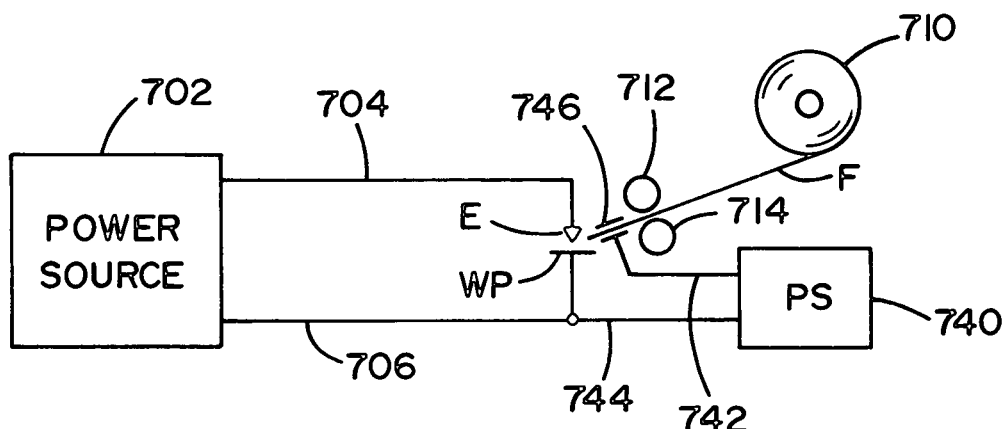

In GTAW welding, generally known as TIG welding, it is often necessary to use a filler wire which is directed into the arc section between electrode E and workpiece WP. Addition of filler metal does not change the invention as so far described; however, in another aspect of the present invention a filler wire drive mechanism, as illustrated in FIGS. 15 and 16 is added to the novel TIG welder. In FIG. 15, TIG welder 700 to perform the invention includes a power source 702 having output leads 704, 706 for directing a novel waveform, as so far described, across electrode E and workpiece WP. The waveform is controlled by generator 240 employing the described programs. In accordance with this additional feature of the invention, filler wire F is automatically fed into the gap between the electrode and workpiece from spool 710 through drive rolls 712, 714 rotated by motor 720 through shaft 722 in accordance with a signal from microprocessor 730. Waveform WF is communicated by line 732 to microprocessor 730 which coordinates operation of motor 720 with waveform WF. Thus, filler wire F is fed toward the arc during the outputting of the negative penetration portion of the TIG waveform. Consequently, wire F is fed into the arc during portion 302 in FIG. 9, portion 554 of FIG. 11 and 604 of FIG. 13. Synchronization of the filler wire with the negative portion of the waveform for TIG welding is a feature added to the invention. In some instances, feeder wire F is to be "hot." This is schematically illustrated in FIG. 16 where the same mechanism is employed for feeding wire F into the arc during the TIG welding process. In this further modification of the present invention, power source 740 directs its output through wire F by connecting output leads 742, 744 in series across contact tip 726 and workpiece WP. The power source heats filler wire F. It is also controlled so the waveform across lines 742 and 744 is synchronized with at least part of the waveform from power source 702. Other modifications can be employed for practicing the invention, which invention involves superimposing high frequency current pulses in at least the negative section of a pulsed waveform either DC or AC. This invention is primarily used for a TIG welder.

Having thus defined the invention, the following is claimed:

1. A GTAW welding process performed across a non-consumable tungsten electrode and a workpiece with a power source having a first output lead connected to said non-consumable tungsten electrode and a second output lead connected to said workpiece and a waveform generator for creating a TIG AC waveform with a selected profile across said power leads, said process comprising: alternating said TIG AC waveform between a positive electrode-cleaning current section and a negative penetration current section at a given overall frequency, wherein each of said current sections approaches a peak current and has a duration; and alternately pulsing only said negative penetration current section between a high current level equal to said peak current of said negative penetration current section and a low current level in the opposite direction of said peak current of said negative penetration current section at a pulsing frequency greater than said given overall frequency.

2. The process as defined in claim 1 wherein said power source is an inverter operated at a frequency greater than about 18 kHz and said waveform profile is created by a digital waveform generator controlling said power source.

3. The process of claim 1 wherein said overall frequency is less than 20 Hz.

4. The process of claim 1 wherein said pulsing frequency is in the range of 50 Hz to 1000 Hz.

5. The process of claim 1 wherein said peak currents of said current sections are different.

6. The process of claim 1 wherein said durations of said current sections are different.

7. The process of claim 1 further including feeding a filler wire into a gap between said non-consumable tungsten electrode and said workpiece at timed intervals that are synchronized with one of said current sections.

8. The process of claim 1 wherein said low current level is in the range of 25-80% of said high current level.

9. A TIG welding process performed across a non-consumable tungsten electrode and a workpiece with a power source having a first output lead connected to said non-consumable tungsten electrode and a controller for creating a DC negative TIG waveform across said power leads, said process comprising: alternating said DC negative TIG waveform between a background current section and a penetration current section at a given overall frequency, wherein each of said current sections approaches a peak current and has a duration; and alternately pulsing only said penetration current section between a high current level equal to said penetration current section's peak current and a low current level at a pulsing frequency greater than said given overall frequency.

10. The process as defined in claim 9 wherein said power source is an inverter and said process includes:
(c) operating said inverter at a frequency greater than about 18 kHz; and,
(d) creating said waveform profile by a digital waveform generator controlling said inverter.

11. The process of claim 9 wherein said overall frequency is less than 20 Hz.

12. The process of claim 9 wherein said pulsing frequency is in the range of 50 Hz to 1000 Hz.

13. The process of claim 9 wherein said peak currents of said current sections are different.

14. The process of claim 9 wherein said durations of said current sections are different.

15. The process of claim 9 further including feeding a filler wire into a gap between said non-consumable tungsten electrode and said workpiece at timed intervals that are synchronized with one of said current sections.

16. The process of claim 9 wherein said low current level is in the range of 25-80% of said high current level.

* * * * *

UNITED STATES PATENT AND TRADEMARK OFFICE
CERTIFICATE OF CORRECTION

| | | |
|---|---|---|
| PATENT NO. | : 8,598,491 B2 | Page 1 of 1 |
| APPLICATION NO. | : 11/265965 | |
| DATED | : December 3, 2013 | |
| INVENTOR(S) | : Peters | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2206 days.

Signed and Sealed this
Seventh Day of April, 2015

Michelle K. Lee
*Director of the United States Patent and Trademark Office*